(12) United States Patent
Chang et al.

(10) Patent No.: US 10,070,181 B2
(45) Date of Patent: Sep. 4, 2018

(54) POWER SPLITTER AND SATELLITE SIGNAL RECEPTION SYSTEM

(71) Applicant: MICROELECTRONICS TECHNOLOGY, INC., Hsinchu (TW)

(72) Inventors: Kuotien Chang, Hsinchu (TW); Chia Lun Chen, Hsinchu (TW)

(73) Assignee: Microelectronics Technology, Inc., Hsinchu (TW)

( * ) Notice: Subject to any disclaimer, the term of this patent is extended or adjusted under 35 U.S.C. 154(b) by 15 days.

(21) Appl. No.: 15/214,846

(22) Filed: Jul. 20, 2016

(65) Prior Publication Data
US 2018/0027289 A1    Jan. 25, 2018

(51) Int. Cl.
*H04N 21/443*    (2011.01)
*H04H 20/22*    (2008.01)

(52) U.S. Cl.
CPC ........ *H04N 21/4432* (2013.01); *H04H 20/22* (2013.01); *H04N 21/4436* (2013.01)

(58) Field of Classification Search
CPC . H04N 21/4432; H04N 21/4436; H04H 20/22
See application file for complete search history.

(56) References Cited

U.S. PATENT DOCUMENTS

| 4,672,687 | A | * | 6/1987 | Horton | H01Q 3/24 333/103 |
| 5,072,199 | A | | 12/1991 | Furlow | |
| 5,673,010 | A | * | 9/1997 | Dusseux | H01P 5/16 333/109 |

(Continued)

FOREIGN PATENT DOCUMENTS

| CN | 103280621 A | 9/2013 |
| CN | 104363432 A | 2/2015 |
| WO | WO 2010/086656 | 8/2010 |

OTHER PUBLICATIONS

European patent office search report for 16180295.4-1905 dated Jan. 31, 2017.

(Continued)

*Primary Examiner* — Bobbak Safaipour
(74) *Attorney, Agent, or Firm* — Muncy, Geissler, Olds & Lowe, P.C.

(57) ABSTRACT

The present disclosure provides a satellite signal reception system comprising a low noise block down-converter for receiving satellite signals; a plurality of receivers configured to transmit the satellite signals from the low noise block down-converter to a display device; and a power splitter. The power splitter includes a first port electrically connected to the low noise block down-converter via a single cable; a plurality of second ports electrically connected to the plurality of receivers; a signal-distributing circuit electrically connecting the first port to the plurality of second ports; a plurality of power-supplying circuits electrically connecting the plurality of second ports to the first port; and a command-transmitting circuit electrically connecting the plurality of second ports to the first port, wherein the command-transmitting circuit includes a controller unit programmed to forward DiSEqC commands from the plurality of second ports to the first port in a first-in-first-out manner.

20 Claims, 9 Drawing Sheets

(56) References Cited

U.S. PATENT DOCUMENTS

| | | | | |
|---|---|---|---|---|
| 5,959,592 A * | 9/1999 | Petruzzelli | | H01Q 1/247 343/756 |
| 7,085,529 B1 * | 8/2006 | Arsenault | | H04H 40/90 348/E7.093 |
| 8,471,648 B2 * | 6/2013 | Rijssemus | | H03H 7/48 333/119 |
| 8,699,983 B2 * | 4/2014 | Xiu | | H01Q 1/247 455/213 |
| 9,831,857 B2 * | 11/2017 | Facchini | | H03K 5/13 |
| 2003/0043518 A1 * | 3/2003 | Purpura | | H02H 11/00 361/62 |
| 2006/0174282 A1 | 8/2006 | Dennison et al. | | |
| 2006/0225098 A1 * | 10/2006 | James | | H01Q 1/125 725/63 |
| 2010/0164504 A1 * | 7/2010 | Bradley | | H04B 3/46 324/520 |
| 2010/0169937 A1 * | 7/2010 | Atwal | | H04L 45/123 725/68 |
| 2012/0028587 A1 * | 2/2012 | Ferguson | | H01Q 3/267 455/67.14 |
| 2014/0130107 A1 * | 5/2014 | Tatem | | H04H 20/63 725/81 |
| 2014/0256246 A1 * | 9/2014 | Eitan | | H04H 20/12 455/3.02 |
| 2016/0248519 A1 * | 8/2016 | Novack | | G02B 6/2793 |
| 2017/0201218 A1 * | 7/2017 | Wang | | H03F 1/565 |

OTHER PUBLICATIONS

Yahya S.H. Khraisat, Multi-Switch Satellite Digital System (MSDS), MRRS—2008 symposium proceedings, Sep. 22-24, 2008, pp. 317-320, Kiev, Ukraine.

EFM8UB1 Data Sheet, Preliminary Rev. 0.3, Silicon Labs, Silicon Laboratories Inc., Texas.

\* cited by examiner

POWER SPLITTER AND SATELLITE SIGNAL RECEPTION SYSTEM

TECHNICAL FIELD

The present disclosure relates to a power splitter and satellite signal reception system, and more particularly to a power splitter and satellite signal reception system incorporating a controller unit to manage DiSEqC commands so as to avoid command conflict.

DISCUSSION OF THE BACKGROUND

In modern times, satellite broadcasting has become a common m form of providing communication signals. In particular, single-cable signal distribution is greatly utilized. There has already been extended single-cable satellite signal receiving systems in which multiple users in a building receive broadcast video programs over a single coaxial cable. In the past, most locations, such as households, had at most one set-top box (STB). A location having multiple STBs was considered rare. Today, many locations, such as households, implement two or more STBs sharing the same digital broadcast satellite (DBS) video service.

One communication protocol that is used in video distribution systems or provided as part of a video distribution system component is a Digital Satellite Equipment Control (DiSEqC) protocol. A DiSEqC system is a communication bus particularly used between satellite receivers and satellite peripheral equipment (e.g. multi-switches, LNBs), using coaxial cable as the network media. DiSEqC can be integrated into consumer satellite installations and replace conventional analog (voltage, tone or pulse width) switching and other control wiring between devices.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this m application, including this "Discussion of the Background" section, constitutes prior art to the present disclosure.

SUMMARY

One aspect of the present disclosure provides a power splitter and satellite signal reception system incorporating a controller unit to manage DiSEqC commands so as to avoid command conflict.

The present disclosure provides a power splitter comprising a first port configured to receive satellite signals and a plurality of second ports; a signal-distributing circuit electrically connecting the first port to the plurality of second ports; at least one power-supplying circuit electrically connecting the plurality of second ports to the first port; and a command-transmitting circuit electrically connecting the plurality of second ports to the first port, wherein the command-transmitting circuit includes a controller unit programmed to forward DiSEqC commands from the plurality of second ports to the first port in a first-in-first-out manner.

The present disclosure also provides a satellite signal reception system comprising a low noise block down-converter configured for receiving satellite signals from a satellite antenna; a plurality of receivers configured to transmit the satellite signals from the low noise block down-converter to a display device; and a power splitter. In some embodiments of the present disclosure, the power splitter comprises a first port electrically connected to the low noise block down-converter via a single cable; a plurality of second ports electrically connected to the plurality of receivers; a signal-distributing circuit electrically connecting the first port to the plurality of second ports; a plurality of power-supplying circuits electrically connecting the plurality of second ports to the first port; and a command-transmitting circuit electrically connecting the plurality of second ports to the first port, wherein the command-transmitting circuit includes a controller unit programmed to forward DiSEqC commands from the plurality of second ports to the first port in a first-in-first-out manner.

In some embodiments of the present disclosure, the signal-distributing circuit comprises two inductors each having a first end connected to the first port and a second end connected to a resistor.

In some embodiments of the present disclosure, the signal-distributing circuit comprises a first level distributor electrically connected to the first port and two second level distributors electrically connected between the first level distributor and the plurality of second ports.

In some embodiments of the present disclosure, an input of the first level distributor is electrically connected to the first port, an input of the second level distributor is electrically connected to an output of the first level distributor, and an output of the second level distributor is electrically connected to one of the plurality of second ports.

In some embodiments of the present disclosure, the power splitter further comprises a plurality of DC blocking capacitors between the signal-distributing circuit and the plurality of second ports.

In some embodiments of the present disclosure, each of the plurality of power-supplying circuits comprises a filter and a diode connected in series.

In some embodiments of the present disclosure, the filter comprises an inductor and a capacitor connected in parallel.

In some embodiments of the present disclosure, each of the plurality of power-supplying circuits is electrically connected to the first port via an inductor.

In some embodiments of the present disclosure, an output of the controller unit is electrically connected to the first port via an inductor.

In some embodiments of the present disclosure, an input of the controller unit is electrically connected to one of the plurality of second ports via an inductor and a resistor in series.

According to the prior art without using the power splitter of the present disclosure, when several receivers send DiSEqC commands to the LNB down-converter through the single cable at the same time, a command confliction occurs, and one receiver prevails over the others. In other words, only one of the several receivers successfully sends its DiSEqC command to the LNB down-converter, while the others fail and must keep resending the DiSEqC command until the transmission is successful. Obviously, the transmission efficiency between the receivers and the LNB down-converter is poor. In contrast, in some embodiments of the present disclosure, the DiSEqC commands from different receivers are transmitted to the controller unit via different command-forwarding paths and the controller unit is programmed to forward the DiSEqC commands to the LNB down-converter in a first-in-first-out manner so as to resolve the command confliction of the prior art.

According to the DiSEqC protocol, the DiSEqC commands can be transmitted from the receivers to the LNB down-converter at two different voltages. When one receiver transmits a first DiSEqC command at a high voltage with a long cable and another receiver transmits a second DiSEqC command at a low voltage with a short cable at the same time, the second DiSEqC command may prevail over the first DiSEqC command because the voltage drop of the long cable may decrease the high voltage so as to be lower than the low voltage. Consequently, the transmission of the first DiSEqC command at the high voltage will fail. In some embodiments of the present disclosure, the DiSEqC commands from different receivers are transmitted to the controller unit via different command-forwarding paths, and the controller unit is programmed to forward the DiSEqC commands to the LNB down-converter in a first-in-first-out manner so as to resolve the problem resulting from the voltage drop of the cable length.

In some embodiments of the present disclosure, the operation power and the DiSEqC commands may be transmitted by different voltages; the present disclosure transmits the operation power; and the DiSEqC commands from the second port to the first port through different paths, i.e., the power-supply paths and the command-forwarding path, and the transmission of the DiSEqC commands will not be influence by the supply of the operation power. In some embodiments of the present disclosure, the independent transmission path of the DiSEqC commands (the command-forwarding path) effectively improves the transmission quality and efficiency of the DiSEqC commands between the receivers and the LNB down-converter.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a power splitter and satellite signal reception system incorporating a controller unit to manage DiSEqC commands so as to avoid command conflicts. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
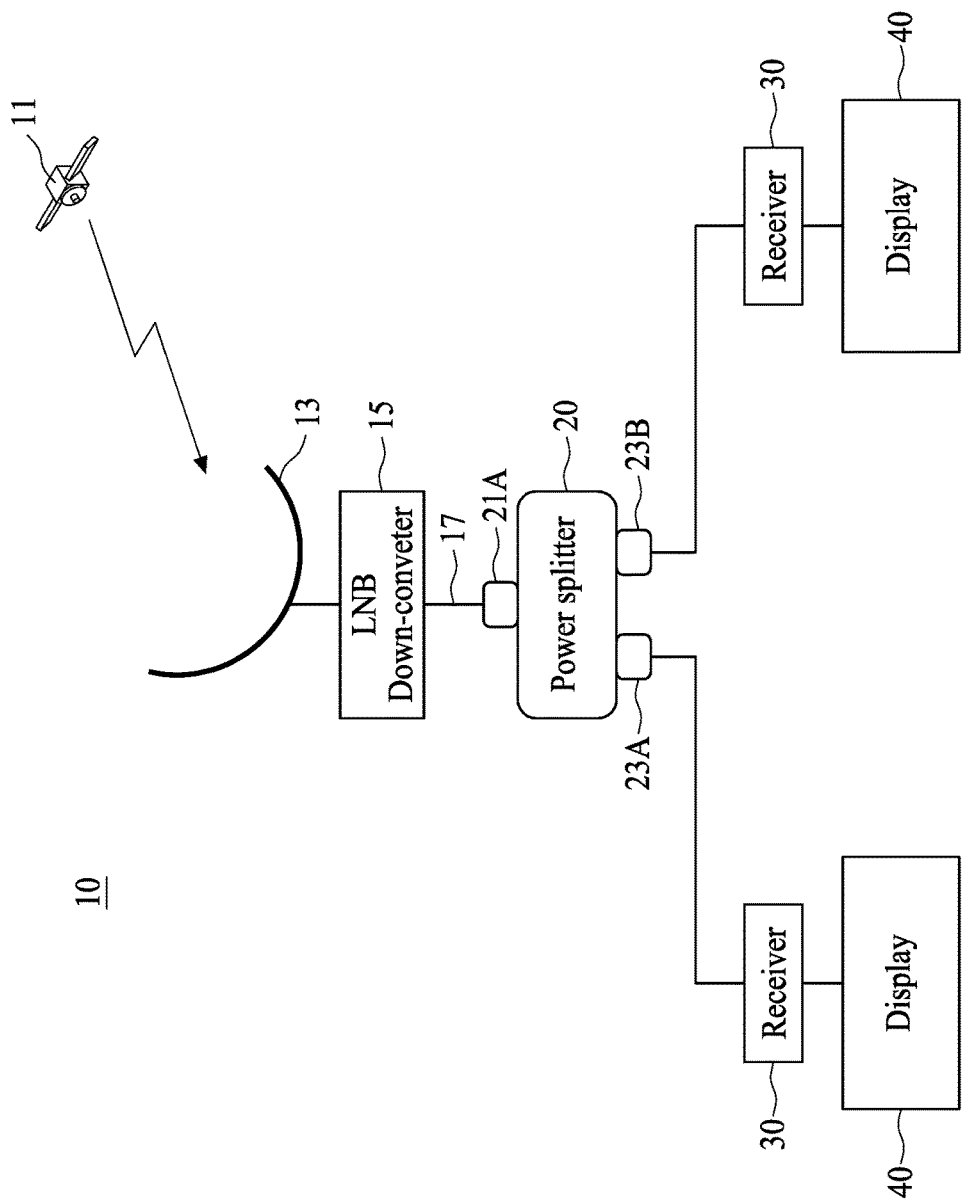
FIG. 1 is a schematic diagram of a satellite signal reception system according to some embodiments of the present disclosure.

FIG. 1 is a schematic diagram of a satellite signal reception system 10 according to some embodiments of the present disclosure. In some embodiments of the present disclosure, the satellite signal reception system 10 comprises a satellite antenna 13 for receiving satellite signals from a satellite 11; a low noise block (LNB) down-converter 15 configured for converting the satellite signals received from the satellite antenna 13; a power splitter 20 having a first port 21 and a plurality of second ports 23A, 23B; a plurality of receivers 30 electrically connected to one of the second ports 23A, 23B respectively; and a plurality of display devices 40 electrically connected to one of the receivers 30. In some embodiments of the present disclosure, the first port 21 is electrically connected to the LNB down-converter 15 via a single cable 17.

In some embodiments of the present disclosure, the LNB down-converter 15 receives the satellite signals from the satellite antenna 13, converts the received satellite signal into an intermediate frequency (IF), and amplifies the IF signals to acceptable output levels. In some embodiments of the present disclosure, the receivers 30 convert the signals from the LNB down-converter 15 into a form that can be used in content displays, or the like. In some embodiments of the present disclosure, the receivers 30 include but are not limited to, television tuner-receivers, single or digital video recorders (DVRs), television receivers, and set-top boxes (STBs).

Figure 2:
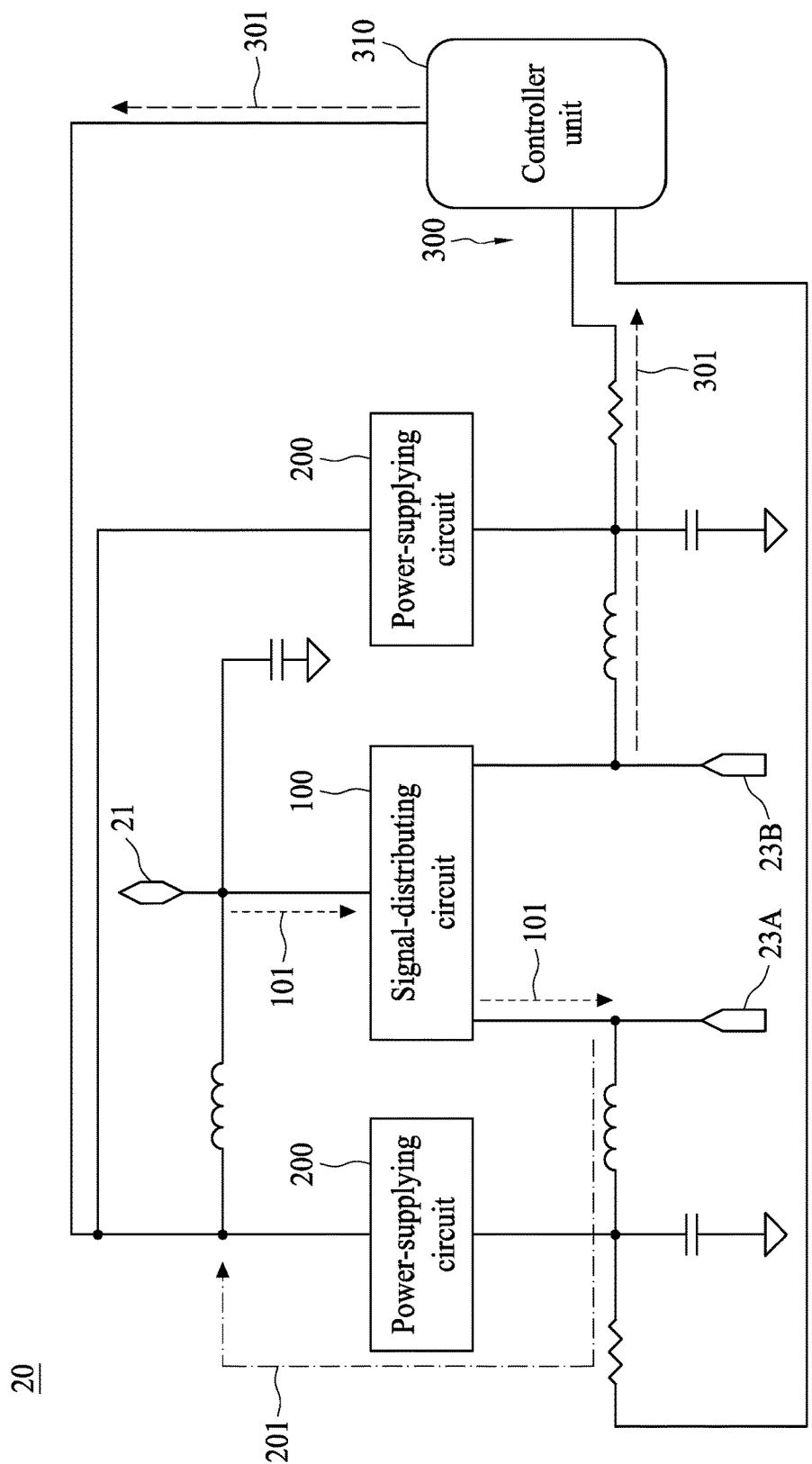
FIG. 2 is a schematic diagram of the power splitter according m to some embodiments of the present disclosure.

FIG. 2 is a schematic diagram of the power splitter 20 according to some embodiments of the present disclosure. In some embodiments of the present disclosure, the power splitter 20 comprises a first port 21 configured to receive signals from the LNB down-converter 15 and a plurality of second ports 23A, 23B, wherein a signal-distributing circuit 100 electrically connects the first port 21 to the plurality of second ports 23A, 23B so as to form a signal-distributing path 101 for distributing signals from the first port 21 (the LNB down-converter 15) to the plurality of second ports 23A, 23B (receivers 30); a plurality of power-supplying circuits 200 electrically connecting the plurality of second ports 23A, 23B to the first port 21 so as to form a plurality of power-supply paths 201; and a command-transmitting circuit 300 electrically connecting the plurality of second ports 23A, 23B to the first port 21 so as to form a command-forwarding path 301.

Figure 3:
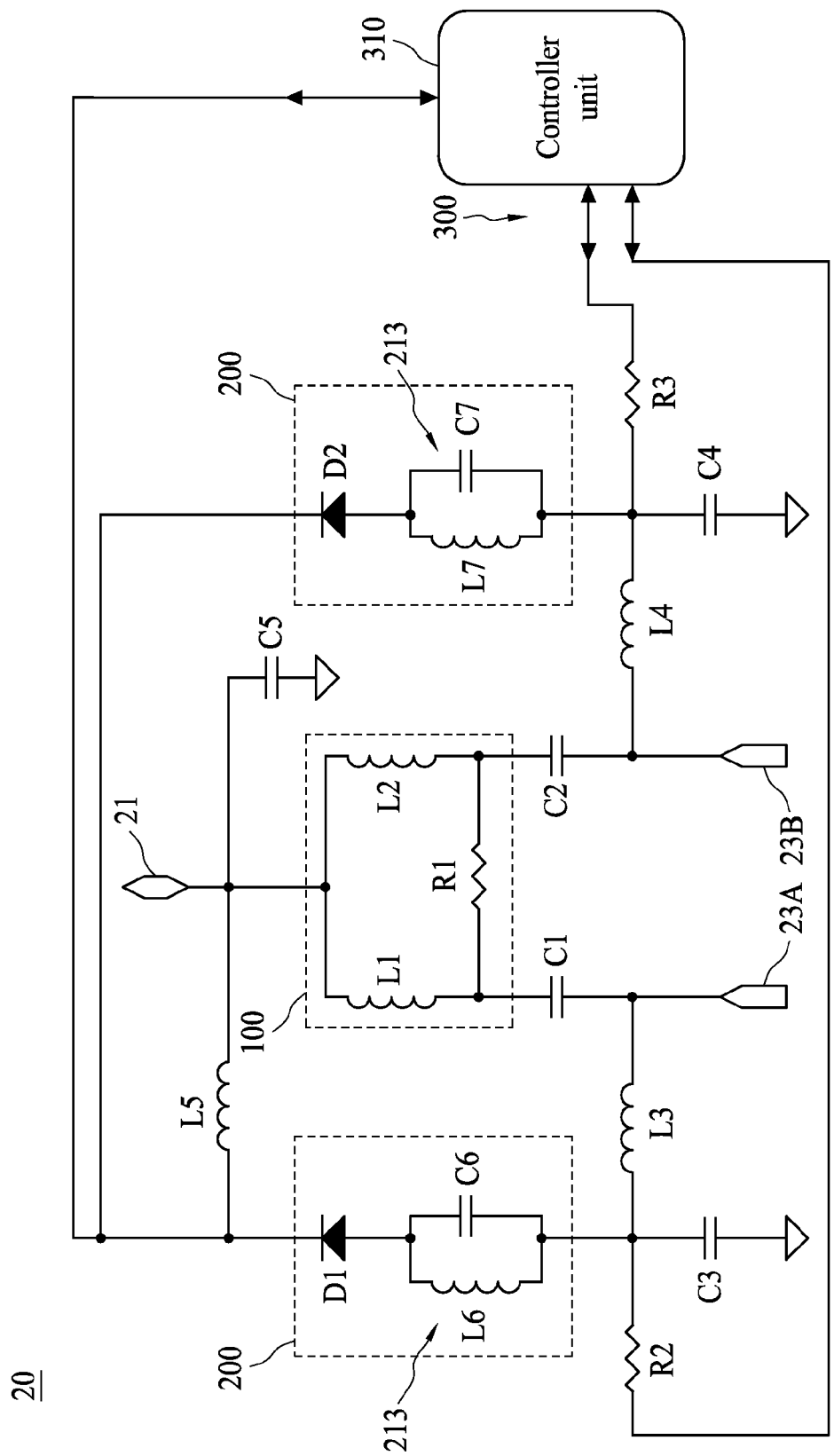
FIG. 3 is a circuit diagram of the power splitter according to some embodiments of the present disclosure.

FIG. 3 is a circuit diagram of the power splitter 20 according to some embodiments of the present disclosure. In some embodiments of the present disclosure, the signal-distributing circuit 100 comprises two inductors L1, L2 each having a first end connected to the first port 21 and a second end connected to a resistor R1, wherein the second ends of the two inductors L1, L2 electrically connect the two ends of the resistor R1. In some embodiments of the present disclosure, the power splitter 20 further comprises a plurality of DC blocking capacitors C1, C2 between the signal-distributing circuit 100 and the plurality of second ports 23A, 23B.

In some embodiments of the present disclosure, each of the plurality of power-supplying circuits 200 comprises a filter 213 and a diode D1 (D2) connected in series, wherein the filter 213 comprises an inductor L6 (L7) and a capacitor C6 (C7) connected in parallel. In some embodiments of the present disclosure, each of the plurality of power-supplying circuits 200 is electrically connected to the first port 21 via an inductor L5.

In some embodiments of the present disclosure, the command-transmitting circuit 300 includes a controller unit 310, such as a micro controller unit (MCU), programmed to forward DiSEqC commands from the plurality of second ports 23A, 23B to the first port 21 in a first-in-first-out manner. In some embodiments of the present disclosure, an input of the controller unit 310 is electrically connected to one of the plurality of second ports 23A, 23B via an inductor L3 (L4) and a resistor R2 (R3) connected in series, and an output of the controller unit is electrically connected to the first port 21 via the inductor L5.

Figure 4:
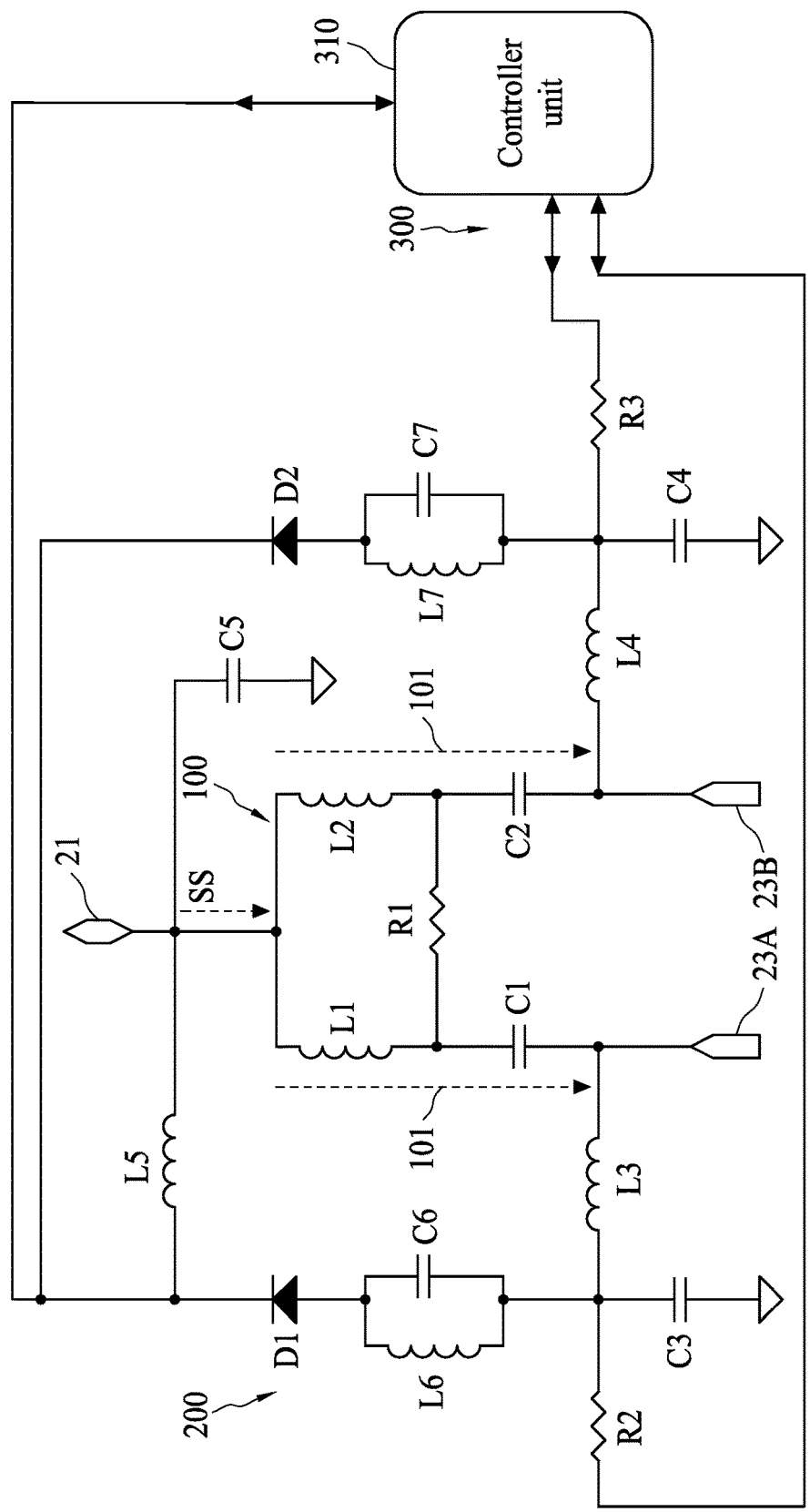
FIG. 4 is a circuit diagram showing the signal-distributing path of the power splitter according to some embodiments of the present disclosure.

FIG. 4 is a circuit diagram showing the signal-distributing path 101 of the power splitter 20 according to some embodiments of the present disclosure. In some embodiments of the present disclosure, the signal-distributing circuit 100 is configured to receive the satellite signal (SS) from the first port 21 and transmit the satellite signal (SS) to the plurality of second ports 23A, 23B via the inductor L1 (L2) and the capacitor C1 (C2) serving as a DC blocking capacitor.

Figure 5:
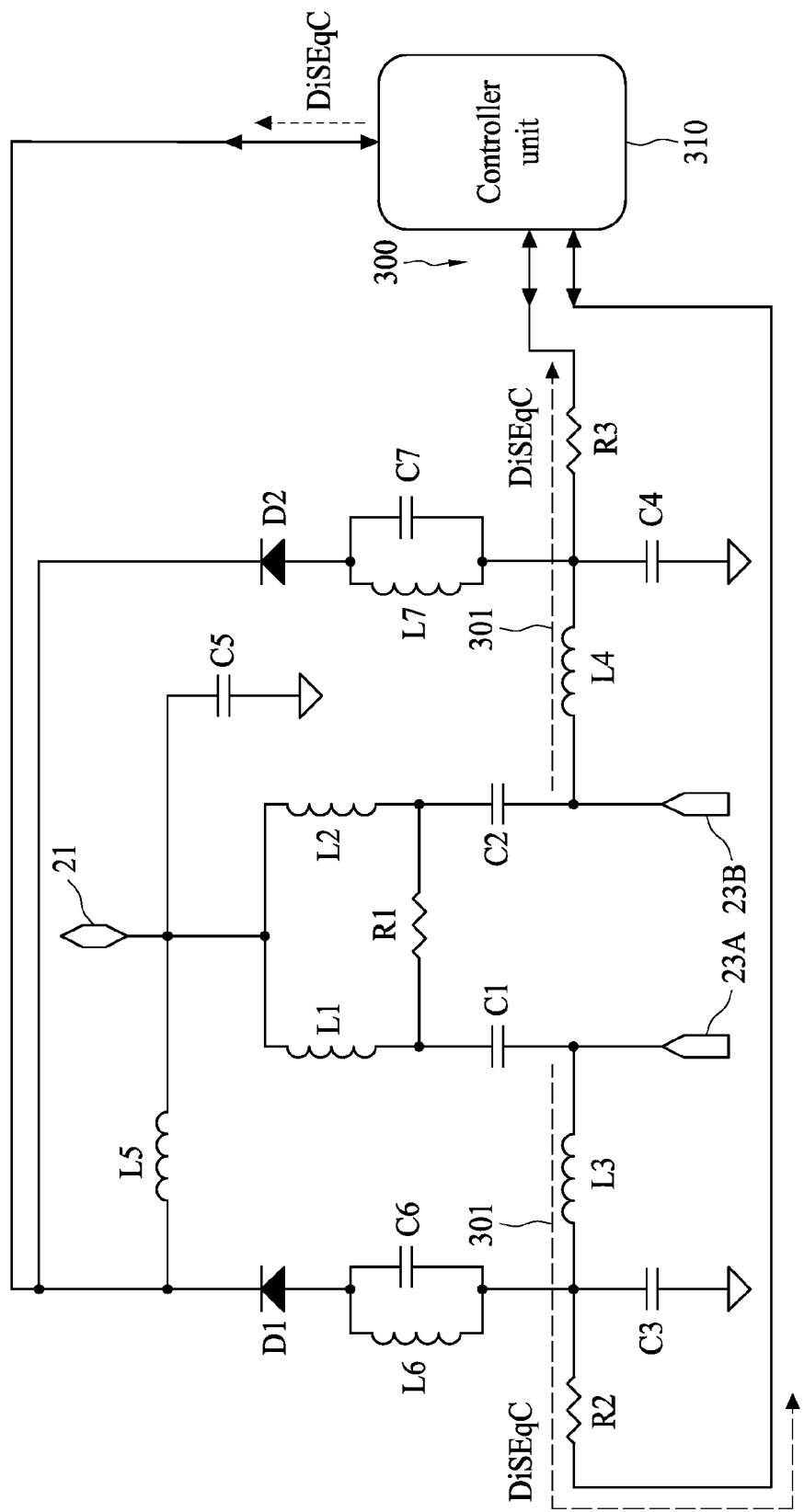
FIG. 5 is a circuit diagram showing the command-forwarding path of the power splitter according to some embodiments of the present disclosure.

FIG. 5 is a circuit diagram showing the command-forwarding path 301 of the power splitter 20 according to some embodiments of the present disclosure. The receiver 30 is configured to communicate with the LNB down-converter 15 according to a DiSEqC command. In some embodiments of the present disclosure, the DiSEqC commands from different receivers 30 are transmitted from the second ports 23A, 23B to the controller unit 310 via different command-forwarding paths 301, and the controller unit 310 forwards the received DiSEqC commands to the LNB down-converter 15 via the first port 21 in a first-in-first-out manner so as to avoid the command confliction.

Figure 6:
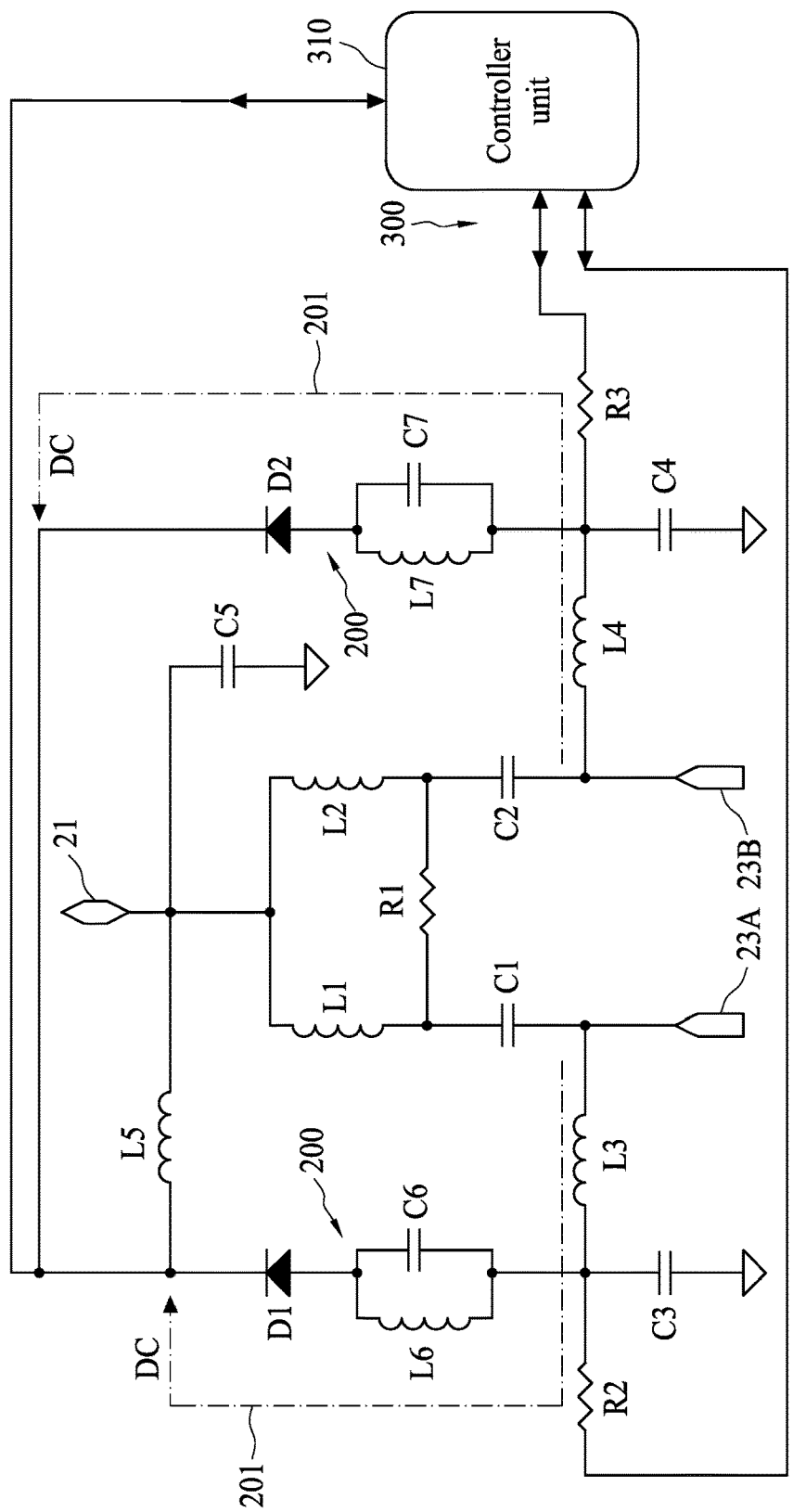
FIG. 6 is a circuit diagram showing the power-supply path of the power splitter according to some embodiments of the present disclosure.

FIG. 6 is a circuit diagram showing the power-supply path 201 of the power splitter 20 according to some embodiments of the present disclosure. In some embodiments of the present disclosure, the operation power (DC) of the LNB down-converter 15 is provided by the receivers 30 through the second ports 23A, 23B, the power-supplying circuits 200, and the first port 21. According to the DiSEqC protocol, the operation power and the DiSEqC commands may be transferred to the LNB down-converter 15 by different voltages. In some embodiments of the present disclosure, the operation power and the DiSEqC commands are transferred from the second ports 23A, 23B to the first port 21 through different paths, i.e., the power-supply path 201 and the command-forwarding path 301 respectively, and the transmission of the DiSEqC commands will not be influence by the supply of the operation power. In some embodiments of the present disclosure, the independent transmission path of the DiSEqC commands (the command-forwarding path 301) effectively improves the transmission quality and efficiency of the DiSEqC commands between the receivers 30 and the LNB down-converter 15.

Figure 7:
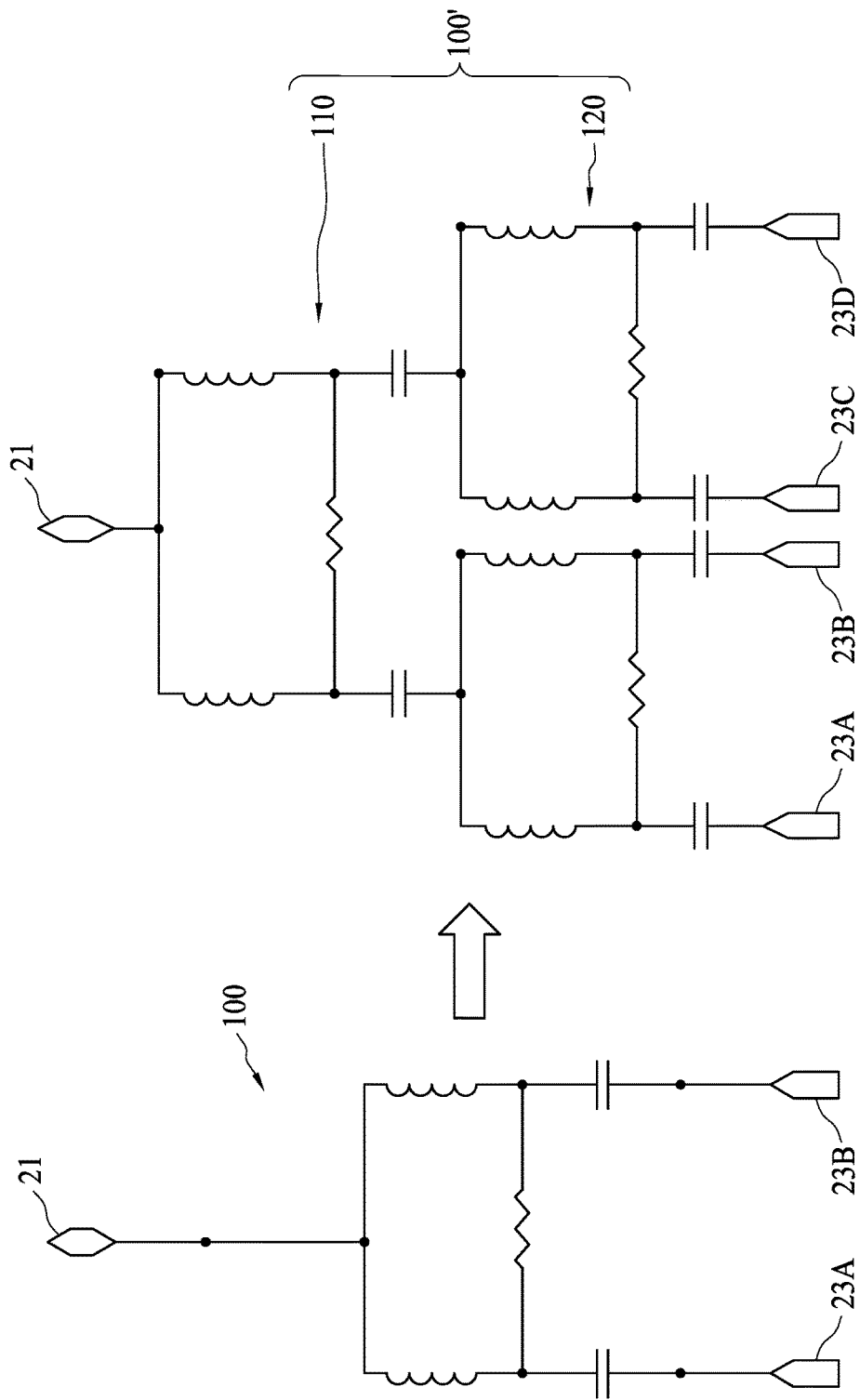
FIG. 7 is a diagram showing the variation of the signal-distributing circuit according to some embodiments of the present disclosure.

FIG. 7 is a diagram showing the variation of the signal-distributing circuit according to some embodiments of the present disclosure. In some embodiments of the present disclosure, the signal-distributing circuit 100 is capable of distributing satellite signals to two receivers 30 via the two second ports 23A, 23B. In contrast, the signal-distributing circuit 100' is capable of distributing satellite signals to four (4) receivers 30 via the four (4) second ports (23A, 23B, 23C, 23D).

In some embodiments of the present disclosure, the signal-distributing circuit 100' comprises a first level distributor 110 electrically connected to the first port 21 and two second level distributors 120 electrically connecting the first level distributor 110 to the plurality of second ports (23A, 23B, 23C, 23D). In some embodiments of the present disclosure, the first level distributor 110 and the second level distributor 120 have the same circuit elements (two inductors and one resistor) and configuration. In some embodiments of the present disclosure, the first level distributor 110 and the second level distributor 120 have the same circuit elements (two inductors and one resistor) and configuration as the signal-distributing circuit 100.

In some embodiments of the present disclosure, an input of the first level distributor 110 is electrically connected to the first port 21, an input of the second level distributor 120 is electrically connected to an output of the first level distributor 110, and an output of the second level distributor 120 is electrically connected to one of the plurality of second ports (23A, 23B, 23C, 23D). In some embodiments of the present disclosure, the signal-distributing circuit 100' can be further expanded by adding more level distributors after the second level distributor 120 so as to increase the number of the second ports for connecting more receivers 30; for example, adding four (4) third level distributors after the second level distributors 120 can increase the number of the second ports to eight (8), adding eight (8) fourth level distributors after the third level distributors increase the number of the second ports to sixteen (16), and so on.

Figure 8:
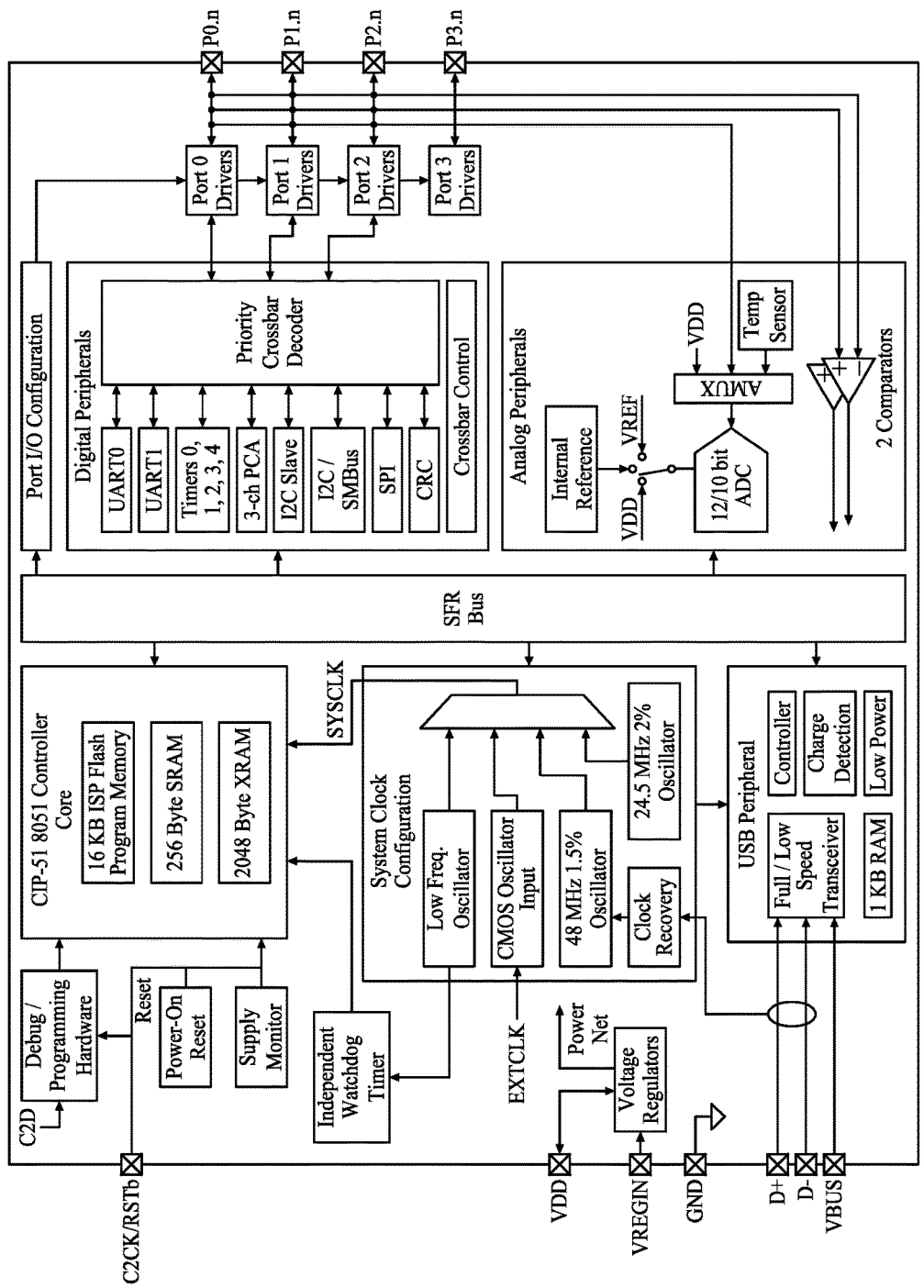
FIG. 8 is a functional block diagram of a controller unit provided by Silicon Laboratories, Inc.

FIG. 8 is a functional block diagram of a controller unit provided by Silicon Laboratories, Inc. In some embodiments of the present disclosure, the controller unit 310 is implemented by a chip EFM8UB1x-QFN20 supplied by Silicon Laboratories, Inc. In some embodiments of the present disclosure, the memory (flash program memory, SRAM, XRAM) in the controller core in FIG. 8 can be used to implement a buffer; one of the pins (P0.n, P1.n, P2.n, P3.n) can be used to implement the pin electrically connected to the first port 21, and two of the pins can be used to implement the pins electrically connected to the second port 23A, 23B.

Figure 9:
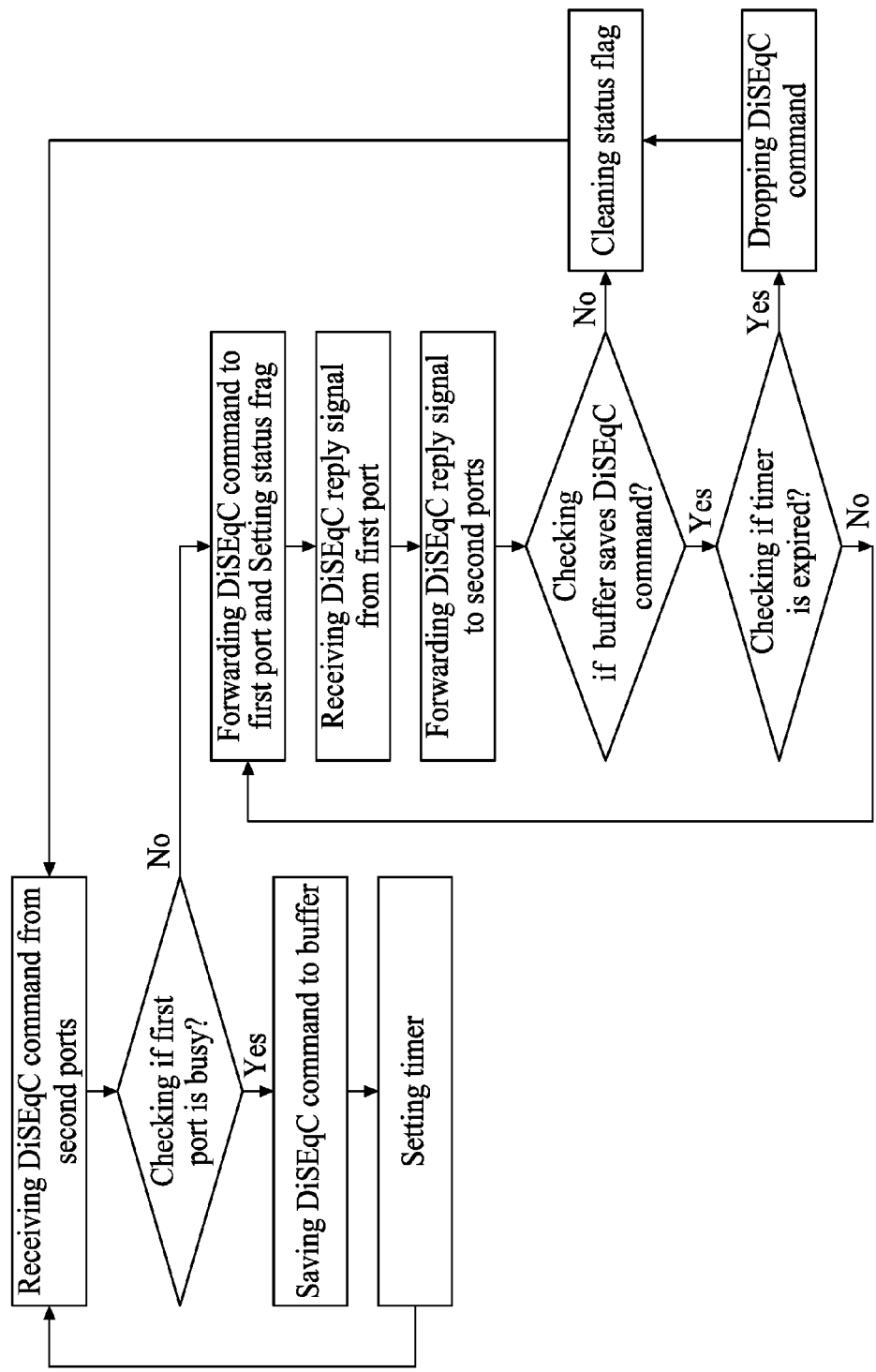
FIG. 9 is a flow chart for the controller unit to manage DiSEqC commands according to some embodiments of the present disclosure.

FIG. 9 is a flow chart for the controller unit 310 to manage DiSEqC commands according to some embodiments of the present disclosure. In some embodiments of the present disclosure, when the controller unit 310 receives a DiSEqC command from receivers 30, such as a set-top box via the second ports 23A, the controller unit 310 checks if the first port 21 (the LNB down-converter 15) is busy in processing previously received DiSEqC commands. If the checking result is "Yes", the controller unit 310 saves the received DiSEqC command in a buffer, and sets the timer, i.e., setting timeout; and if the checking result is "No", the controller unit 310 proceeds to directly forward the received DiSEqC command to the LNB down-converter 15 through the first port 21 and the single cable 17 for further de-modulation, and then set a status flag of the first port 21 as "busy."

After receiving the DiSEqC command from the controller unit 310, the LNB down-converter 15 sends a DiSEqC reply signal back to the controller unit 310 via the first port 21 and the single cable 17. After receiving the DiSEqC reply signal from the LNB down-converter 15, the controller unit 310 forwards the DiSEqC reply signal to the receiver 30 sending the DiSEqC command via the second port 23A correspondingly.

Subsequently, the controller unit 310 checks if there is a DiSEqC command saved in the buffer. If the checking result is "No", the controller unit 310 cleans the status flag of the first port 21, and proceeds to wait and receive the next DiSEqC command subsequently sent by the receiver 30 via the second port 23A, 23B. If the checking result is "Yes", the controller unit 310 further checks if the timer is expired, i.e., timeout. If the timer is expired, the controller unit 310 drops the DiSEqC command saved in the buffer, cleans the status flag of the first port 21, and proceeds to wait and receive the next DiSEqC command. If the timer is not expired, the controller unit 310 proceeds to forward the DiSEqC command saved in the buffer to the LNB down-converter 15 via the first port 21 and the single cable 17 for further de-modulation, and then set the status flag of the first port 21 as "busy."

According to the prior art without using the power splitter 20 of the present disclosure, when several receivers 30 send DiSEqC commands to the LNB down-converter 15 through the single cable 17 at the same time, a command confliction occurs, and one receiver 30 prevails over the others. In other words, only one of the several receivers 30 successfully sends its DiSEqC command to LNB down-converter 15, while the others fail and must keep resending the DiSEqC command until the transmission is successful. Obviously, the transmission efficiency between the receivers 30 and the LNB down-converter 15 is poor. In some embodiments of the present disclosure, the DiSEqC commands from different receivers 30 are transmitted to the controller unit 310 via different command-forwarding paths 301 and the controller unit 310 is programmed to forward the DiSEqC commands to the LNB down-converter 15 in a first-in-first-out manner so as to resolve the command confliction of the prior art.

According to the DiSEqC protocol, the DiSEqC commands can be transmitted from the receivers 30 to the LNB down-converter 15 at two different voltages; for example, 13 Volts and 18 Volts. When one receiver 30 transmits a first DiSEqC command at a high voltage with a long cable and another receiver 30 transmits a second DiSEqC command at a low voltage with a short cable at the same time, the second DiSEqC command may prevail over the first DiSEqC command because the voltage drop of the long cable may decrease the high voltage so as to be lower than the low voltage. Consequently, the transmission of the first DiSEqC command at the high voltage will fail. In some embodiments of the present disclosure, the DiSEqC commands from different receivers 30 are transmitted to the controller unit 310 via different command-forwarding paths 301, and the controller unit 310 is programmed to forward the DiSEqC commands to the LNB down-converter 15 in a first-in-first-out manner so as to resolve the problem resulting from the voltage drop of the cable length.

In some embodiments of the present disclosure, the operation power and the DiSEqC commands may be transmitted by different voltages, the present disclosure transmits the operation power and the DiSEqC commands from the second port to the first port through different paths, i.e., the power-supply paths 201 and the command-forwarding path 301, and the transmission of the DiSEqC commands will not be influence by the supply of the operation power. In some embodiments of the present disclosure, the independent transmission path of the DiSEqC commands (the command-forwarding path 301) effectively improves the transmission quality and efficiency of the DiSEqC commands between the receivers 30 and the LNB down-converter 15.

The present disclosure provides a power splitter comprising a first port configured to receive satellite signals and a plurality of second ports; a signal-distributing circuit electrically connecting the first port to the plurality of second ports; at least one power-supplying circuit electrically connecting the plurality of second ports to the first port; and a command-transmitting circuit electrically connecting the plurality of second ports to the first port, wherein the command-transmitting circuit includes a controller unit programmed to forward DiSEqC commands from the plurality of second ports to the first port in a first-in-first-out manner.

The present disclosure also provides a satellite signal reception system comprising a low noise block down-converter configured for receiving satellite signals from a satellite antenna; a plurality of receivers configured to transmit the satellite signals from the low noise block down-converter to a display device; and a power splitter. In some embodiments of the present disclosure, the power splitter comprises a first port electrically connected to the low noise block down-converter via a single cable; a plurality of second ports electrically connected to the plurality of receivers; a signal-distributing circuit electrically connecting the first port to the plurality of second ports; a plurality of power-supplying circuits electrically connecting the plurality of second ports to the first port; and a command-transmitting circuit electrically connecting the plurality of second ports to the first port, wherein the command-transmitting circuit includes a controller unit programmed to forward DiSEqC commands from the plurality of second ports to the first port in a first-in-first-out manner.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power splitter, comprising:
a first port configured to receive satellite signals and a plurality of second ports, wherein the first port is electrically connected to a low noise block down-converter via a single cable;
a signal-distributing circuit electrically connecting the first port to the plurality of second ports;
at least one power-supplying circuit electrically connecting the plurality of second ports to the first port; and
a command-transmitting circuit electrically connecting the plurality of second ports to the first port, wherein the command-transmitting circuit includes a controller unit programmed to forward DiSEqC commands from the plurality of second ports to the first port in a first-in-first-out manner,
wherein the power-supplying circuit is physically and functionally independent from the signal-distributing circuit and command-transmitting circuit, the power-supplying circuit is independent from the command-transmitting circuit and the signal-distributing circuit is independent from the command-transmitting circuit.

2. The power splitter of claim 1, wherein the signal-distributing circuit comprises two inductors each having a first end connected to the first port and a second end connected to a resistor.

3. The power splitter of claim 1, wherein the signal-distributing circuit comprises a first level distributor electrically connected to the first port and two second level distributors electrically connected between the first level distributor and the plurality of second ports.

4. The power splitter of claim 3, wherein an input of the first level distributor is electrically connected to the first port, an input of the second level distributor is electrically connected to an output of the first level distributor, and an output of the second level distributor is electrically connected to one of the plurality of second ports.

5. The power splitter of claim 1, further comprising a plurality of DC blocking capacitors between the signal-distributing circuit and the plurality of second ports.

6. The power splitter of claim 1, wherein each of the plurality of power-supplying circuits comprises a filter and a diode connected in series.

7. The power splitter of claim 6, wherein the filter comprises an inductor and a capacitor connected in parallel.

8. The power splitter of claim 1, wherein each of the plurality of power-supplying circuits is electrically connected to the first port via an inductor.

9. The power splitter of claim 1, wherein an output of the controller unit is electrically connected to the first port via an inductor.

10. The power splitter of claim 1, wherein an input of the controller unit is electrically connected to one of the plurality of second ports via an inductor and a resistor in series.

11. A satellite signal reception system, comprising:
a low noise block down-converter configured for receiving satellite signals from a satellite antenna, wherein the first port is electrically connected to a low noise block down-converter via a single cable;
a plurality of receivers configured to transmit the satellite signals from the low noise block down-converter to a display device; and
a power splitter, comprising:
a first port electrically connected to the low noise block down-converter via a single cable;
a plurality of second ports electrically connected to the plurality of receivers;
a signal-distributing circuit electrically connecting the first port to the plurality of second ports;
a plurality of power-supplying circuits electrically connecting the plurality of second ports to the first port; and
a command-transmitting circuit electrically connecting the plurality of second ports to the first port, wherein the command-transmitting circuit includes a controller unit programmed to forward DiSEqC commands from the plurality of second ports to the first port in a first-in-first-out manner,
wherein the plurality of power-supplying circuits is physically and functionally independent from the signal-distributing circuit and command-transmitting circuit, the power-supplying circuit is independent from the command-transmitting circuit and the signal-distributing circuit is independent from the command-transmitting circuit.

12. The satellite signal reception system of claim 11, wherein the signal-distributing circuit comprises two inductors each having a first end connected to the first port and a second end connected to a resistor.

13. The satellite signal reception system of claim 11, wherein the signal-distributing circuit comprises a first level distributor electrically connected to the first port and two second level distributors electrically connected between the first level distributor and the plurality of second ports.

14. The satellite signal reception system of claim 13, wherein an input of the first level distributor is electrically connected to the first port, an input of the second level distributor is electrically connected to an output of the first level distributor, and an output of the second level distributor is electrically connected to one of the plurality of second ports.

15. The satellite signal reception system of claim 11, further comprising a plurality of DC blocking capacitors between the signal-distributing circuit and the plurality of second ports.

16. The satellite signal reception system of claim 11, wherein each of the plurality of power-supplying circuits comprises a filter and a diode connected in series.

17. The satellite signal reception system of claim 16, wherein the filter comprises an inductor and a capacitor connected in parallel.

18. The satellite signal reception system of claim 11, wherein each of the plurality of power-supplying circuits is electrically connected to the first port via an inductor.

19. The satellite signal reception system of claim 11, wherein an output of the controller unit is electrically connected to the first port via an inductor.

20. The satellite signal reception system of claim 11, wherein an input of the controller unit is electrically connected to one of the plurality of second ports via an inductor and a resistor in series.

\* \* \* \* \*